(12) United States Patent
Anderson

(10) Patent No.: US 8,924,676 B1
(45) Date of Patent: Dec. 30, 2014

(54) EFFICIENT STORAGE LOAD REDISTRIBUTION

(75) Inventor: David Anderson, Salt Lake City, UT (US)

(73) Assignee: EMC Corporation, Hopkinton, MA (US)

( * ) Notice: Subject to any disclaimer, the term of this patent is extended or adjusted under 35 U.S.C. 154(b) by 552 days.

(21) Appl. No.: 13/171,771

(22) Filed: Jun. 29, 2011

(51) Int. Cl.
*G06F 12/00* (2006.01)
*G06F 12/06* (2006.01)

(52) U.S. Cl.
CPC ........ *G06F 12/0646* (2013.01); *G06F 12/0653* (2013.01)
USPC .................... 711/165; 711/112; 711/E12.002

(58) Field of Classification Search
CPC ...... G06F 3/067; G06F 3/0643; G06F 3/0655
See application file for complete search history.

(56) References Cited

U.S. PATENT DOCUMENTS

| 8,479,242 | B1 * | 7/2013 | Chen et al. ....................... 725/96 |
| 2006/0212746 | A1 * | 9/2006 | Amegadzie et al. .............. 714/6 |
| 2009/0172666 | A1 * | 7/2009 | Yahalom et al. .................. 718/1 |

OTHER PUBLICATIONS

Aggarwal et al., "The Load Rebalancing Problem", SPAA '03, Jun. 7-9, 2003, San Diego, CA, 8 pages.

* cited by examiner

*Primary Examiner* — Reginald Bragdon
*Assistant Examiner* — Thanh D Vo
(74) *Attorney, Agent, or Firm* — BainwoodHuang

(57) ABSTRACT

An improved technique of redistributing files on a set of storage disks involves specifying a tolerable difference in the load between a most-loaded storage disk and a least-loaded storage disk. From such a specified tolerable difference, a processor generates a file transfer plan listing a set of files to be moved, from which storage disks the files are to be moved and to which storage disks to move the files. File transfer plans which result from allowing the maximum difference in load between the storage disks to be a small but finite amount typically result in a very small number of files to be moved, resulting in much smaller processing times for transferring the files.

24 Claims, 8 Drawing Sheets

100

Receiving a load balancing tolerance value which identifies a target difference between a load on a most-loaded storage device and a load on a least-loaded storage device of the set of storage devices, a load on a storage device representing an amount of consumed storage space on the storage drive — 102

Generating a file transfer plan based on (i) a file size of each file stored on the set of storage devices, (ii) a load on each storage device of the set of storage devices and (iii) the load balancing tolerance value — 104

Transferring files between storage devices according to the file transfer plan to redistribute the files stored on the set of storage devices — 106

38

| File Name | Current Storage | Next Storage |
|---|---|---|
| File1 | Disk A | Disk D |
| File2 | Disk B | Disk E |
| File 3 | Disk C | Disk E |
| File 4 | Disk A | Disk F |

| File Name | Current Storage | File Size | Is Fragment? |
|---|---|---|---|
| File1 | Disk A/M | 1500 MB | No |
| File2 | Disk B/N | 980 MB | No |
| File 3 | Disk C/O | 730 MB | No |
| File 4 | Disk J/V | 200 MB | Yes |

EFFICIENT STORAGE LOAD REDISTRIBUTION

BACKGROUND

A data storage system which stores files on multiple storage disks includes a central controller connected to each of the storage disks. The central controller runs processes which (i) place files onto the storage disks and (ii) monitor the amount of storage occupied on each of the storage disks.

In many instances, the central controller also runs processes which moves files stored on the storage disks so that the amount of occupied storage on each storage disk is the same. For example, the processes running on the central controller may make a determination that some of the storage disks have a level of occupied storage far in excess of that on other storage disks. In such a situation, the placing of files on a storage disk may consume more processing time due to reduced parallelism of write operations, as the available space is concentrated on fewer storage disks.

A conventional storage rebalancing process makes a determination of all the files stored on the storage disks which are to be moved from their current storage disk to another storage disk in order to equalize the occupied storage on the storage disks as much as possible.

SUMMARY

Unfortunately, the above-described conventional storage rebalancing process suffers from deficiencies which stem from not addressing overhead associated with the movement of each file from one storage disk to another. For example, suppose that the movement of each file consumes about 30 milliseconds of processor and disk seek time. For a modest number of files to be moved, the aggregate overhead is not significant. On the other hand, in large-scale storage systems in which, say, 5,000,000 files are to be moved as part of a rebalancing process, such an overhead adds more than 41 hours to the transfer time of the files. Such a large number of files to be transferred can be expected when the objective of the redistribution process is to minimize the maximum difference in occupied storage between the storage disks.

In contrast to the conventional storage redistribution process which requires an inordinate amount of processing resources needed for moving a large number of files, an improved technique of redistributing files on a set of storage disks involves specifying a tolerable difference in the load between a most-loaded storage disk and a least-loaded storage disk. From such a specified tolerable difference, a controller generates a file transfer plan listing a set of files to be moved, from which storage disks the files are to be moved and to which storage disks to move the files. File transfer plans which result from allowing the maximum difference in load between the storage disks to be a small but finite amount typically result in a very small number of files to be moved, resulting in much smaller processing times for transferring the files.

One embodiment of the improved technique is directed to a computer-implemented method of redistributing files stored on a set of storage devices. The method includes receiving a load balancing tolerance value which identifies a target difference between a load on a most-loaded storage device and a load on a least-loaded storage device of the set of storage devices, a load on a storage device representing an amount of consumed storage space on the storage drive. The method also includes generating a file transfer plan based on (i) a file size of each file stored on the set of storage devices, (ii) a load on each storage device of the set of storage devices and (iii) the load balancing tolerance value. The method further includes transferring files between storage devices according to the file transfer plan to redistribute the files stored on the set of storage devices.

Additionally, some embodiments of the improved technique are directed to a system for redistributing files stored on a set of storage devices. The system includes a network interface coupled to a network, a memory and a processor coupled to the memory, the processor configured to carry the method of redistributing files stored on a set of storage devices.

Furthermore, some embodiments of the improved technique are directed to a computer program product having a non-transitory computer readable storage medium which stores code including a set of server instructions to carry the method of redistributing files stored on a set of storage devices.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 3 is a schematic diagram of a collection of file identifiers which identifies files stored on the storage devices within the electronic environment illustrated in FIG. 1.

FIG. 4 is a schematic diagram of a collection of storage device identifiers which identifies storage devices within the electronic environment illustrated in FIG. 1.

DETAILED DESCRIPTION

An improved technique of redistributing files on a set of storage disks involves specifying a tolerable difference in the load between a most-loaded storage disk and a least-loaded storage disk. From such a specified tolerable difference, a controller generates a file transfer plan listing a set of files to be moved, from which storage disks the files are to be moved and to which storage disks to move the files. File transfer plans which result from allowing the maximum difference in load between the storage disks to be a small but finite amount typically result in a very small number of files to be moved, resulting in much smaller processing times for transferring the files.

Figure 1:
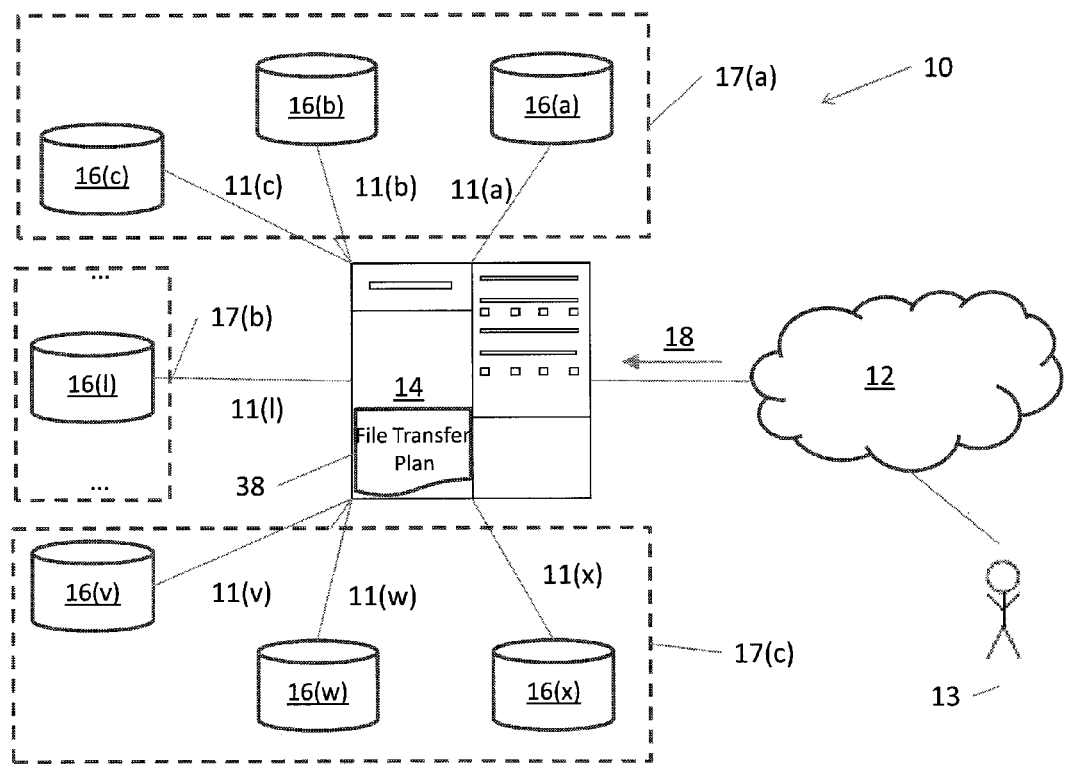
FIG. 1 is a schematic diagram illustrating an electronic environment for carrying out the improved technique.

FIG. 1 shows an electronic environment 10 which is suitable for use by the improved technique. Electronic environment 10 includes communications medium 12, load monitoring server 14 and storage disks 16(a), 16(b), 16(c), ... 16(l), ..., 16(v), 16(w) and 16(x) (storage disks 16).

Communication medium 12 provides connections between load monitoring server 14 and a system user 13. The communications medium 12 may implement a variety of protocols such as TCP/IP, UDP, ATM, Ethernet, Fibre Channel, combinations thereof, and the like. Furthermore, the communications medium 12 may include various components (e.g., cables, switches, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Load monitoring server 14 is constructed and arranged to (i) place files submitted by a user 13 onto the storage disks and (ii) monitor the load on each of the storage disks and the files on each of the storage disks. Given a load balancing tolerance parameter 18, load monitoring server 14 further generates a file transfer plan 38 which attempts to ensure that the maximum difference in loads between the storage disks 16 is at most equal to the value of load balancing tolerance parameter 18.

Storage disks 16 are constructed and arranged to store files loaded either through load monitoring server 14 or by other methods. Storage disks 16 are further constructed and arranged to communicate their states (e.g., load, files currently stored, etc.) with load monitoring server 14. Storage disks 16 are connected to load monitoring server 14 via connectors 11(a), 11(b), ... and 11(x), respectively, which can include cables or wireless connections. Each storage drive 16 may take a variety of forms such as a disk drive, flash memory drive, optical drive, tape drive, etc.

During operation, load monitoring server 14 receives load balancing tolerance parameter 18 from user 13. Load monitoring server 14 performs an assessment of the loads on each of the storage disks 16. If the maximum difference in load between the storage disks 16 is less than or equal to the value of the load balancing tolerance parameter 18, then no action is taken. On the other hand, if the maximum difference in load between the storage disks 16 is greater than the value of the load balancing tolerance parameter 18, load monitoring server 14 generates a file transfer plan 38. File transfer plan 38 includes a list of filenames, the current storage disks 16 of the files having those filenames and the storage disks to which the files having those filenames are to be moved. When load monitoring server 14 executes a file transfer according to file transfer plan 38, the maximum difference in load between the storage disks 16 becomes less than or equal to the value of the load balancing tolerance parameter 18.

Advantageously, the improved technique accomplishes an acceptable level of load rebalancing while consuming a relatively tiny amount of processing resources in transferring files. That is, the load rebalancing problem concerns itself with achieving "good enough" rebalancing instead of perfect rebalancing, and in doing so uses far fewer files in a file transfer. For example, a typical value of the load balancing tolerance parameter 18 is 50 GB in a storage system exceeding 10 TB of available storage. A file transfer plan 38 based on such a value of the load balancing tolerance parameter 18 transfers about 1,000 files. Based on an overhead of 30 milliseconds per file transfer, the aggregate overhead is about 30 seconds of processing time, highly acceptable for rebalancing a storage system exceeding 10 TB of storage.

It should be understood that, in some arrangements, storage disks 16 are arranged in storage servers 17(a), 17(b) and 17(c) (storage servers 17). In this case, the improved technique further involves specifying a value of a server balancing tolerance parameter, from which load monitoring server 14 generates file transfer plan 38 such that the maximum difference between storage servers 17 is at most equal to the value of the server balancing tolerance parameter. During operation, in this case, the generation of file transfer plan 38 would also take this additional constraint into account.

Additional detail of how load monitoring server 14 generates file transfer plan 38 will be explained in regard to FIGS. 2, 3, 4 and 5.

Figure 2:
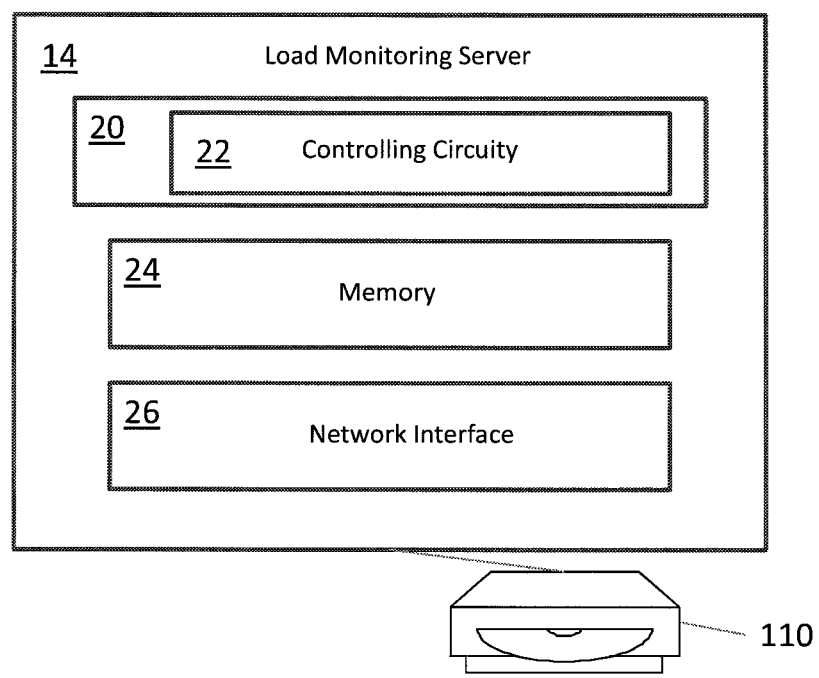
FIG. 2 is a schematic diagram of a load monitoring server within the electronic environment illustrated in FIG. 1.

FIG. 2 shows further detail of load monitoring server 14. Load monitoring server 14 includes a controller 20 having control circuitry 22 which is constructed and arranged to perform rebalancing operations. Load monitoring server 14 also includes memory 24 and network interface 26.

Memory 24 is constructed and arranged to provide memory space for the control circuitry 22 during the rebalancing operations. For example, the control circuitry 22 may require extra memory for buffering purposes or to store various data structures utilized during rebalancing such as the file transfer plan 38.

Network interface 26 is constructed and arranged to send and receive data over communications medium 12. Specifically, network interface 26 is configured to receive data from user 13 over communications medium 12 in the form of load balancing tolerance parameter 18.

It should be understood that the control circuitry 22 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 110 is capable of delivering all or portions of the software to the load monitoring server 14. The computer program product 110 has a non-transitory (or non-volatile) computer readable medium which stores a set of instructions which controls one or more operations of the control circuitry 22. Examples of suitable computer readable storage media include tangible articles of manufacture and apparatus which store instructions in a non-volatile manner such as CD-ROM, flash memory, disk memory, tape memory, and the like.

FIG. 3 shows additional detail of file transfer plan 38. File transfer plan 38 includes entries 39(a), 39(b), 39(c) and 39(d) (file transfer plan entries 39). Each file transfer plan entry 39 includes a filename which corresponds to a file stored on a storage disk 16, a storage disk 16 on which the file is stored and a storage disk 16 to which the file is to be transferred.

In some arrangements, the generation of file transfer plan 38 involves generating a collection of filenames and a collection of storage disks. Such collections are used in determining which files and storage disks are best-suited for inclusion in file transfer plan 38. For example, it is efficient to include a transfer of large files from heavily-loaded storage disks to lightly-loaded storage disks. Such collections provide an accounting of the largest files on the most heavily-loaded storage disks which can be transferred to lightly-loaded storage disks.

FIG. 4 shows detail of a table of filenames 30 used in the generation of file transfer plan 38. Table of filenames 30 includes entries 32(a), 32(b), 32(c) and 32(d) (filename collection entries 32). Each filename collection entry 32 includes a filename corresponding to a file stored on a storage disk 16, a storage disk 16 on which the file is stored and a file size of the file with which the filename corresponds.

In some arrangements, files are copied before storage to provide redundancy in case of a failure of one or more storage disks 16. In this case, each copy of a file is stored on a different storage disk 16 than the original file from which the copy was derived. Each entry 32 then also includes a storage disk which stores a copy of the file with which the filename corresponds.

In some arrangements, load monitoring server 14 breaks up files stored on storage disks 16 into file fragments before storage. In some arrangements, the breaking up of the files into fragments is performed by load monitoring server 14. Each file fragment of a file is stored on a different server, and uses a consistent filename format that indicates the filename of the original file and an identifier of which section of the original file the file fragment contains. In this case, a file is broken into 12 fragments, which the load monitoring server 14 distributes to 12 storage disks 16, on 12 storage servers 17. The generation of the file transfer plan 38 uses the file fragment identifier to enforce constraints, e.g. no more than one fragment of a file per source host.

Figure 5:
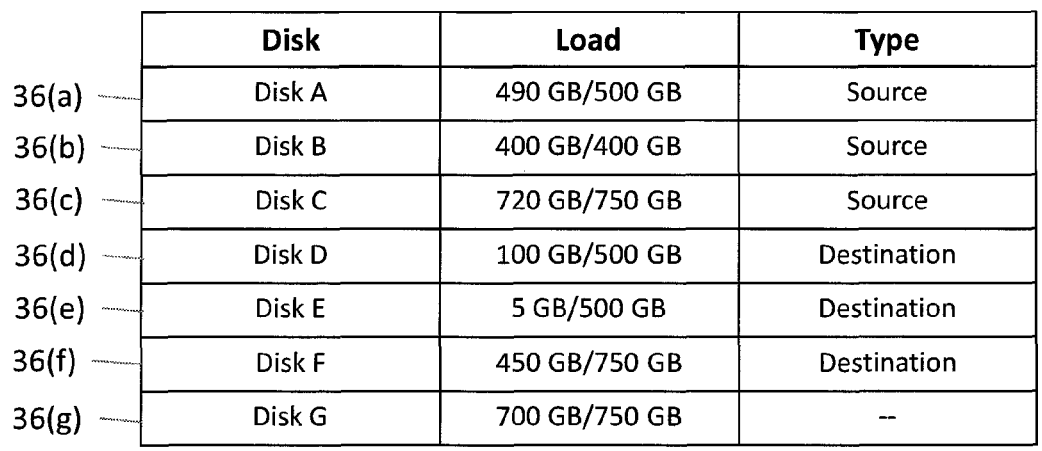
FIG. 5 is a schematic diagram of a file transfer plan for transferring files to and from storage devices within the electronic environment illustrated in FIG. 1.

FIG. 5 shows detail of a table of storage disks 34 used in the generation of file transfer plan 38. Table of storage disks 34 includes entries 36(a), 36(b), 36(c), . . . and 36(g) (storage device collection entries 36). Each storage device collection entry 36 includes a name of a storage device 16 and the current load of the storage device 16 with which the name corresponds.

In some other arrangements, certain storage disks 16 are labeled as source storage disks 16 or destination storage disks 16. Source storage disks 16 are defined to only allow files to be moved from the source storage disk 16 to another, non-source storage disk. Destination storage disks 16, on the other hand, are defined to only allow files to be moved onto the destination storage disk from another, non-destination storage disk 16. In this case, storage device collection entries 36 include an indication of whether a storage disk 16 with which the storage device name corresponds is a source storage disk, a destination storage disk, or neither.

Figure 6:
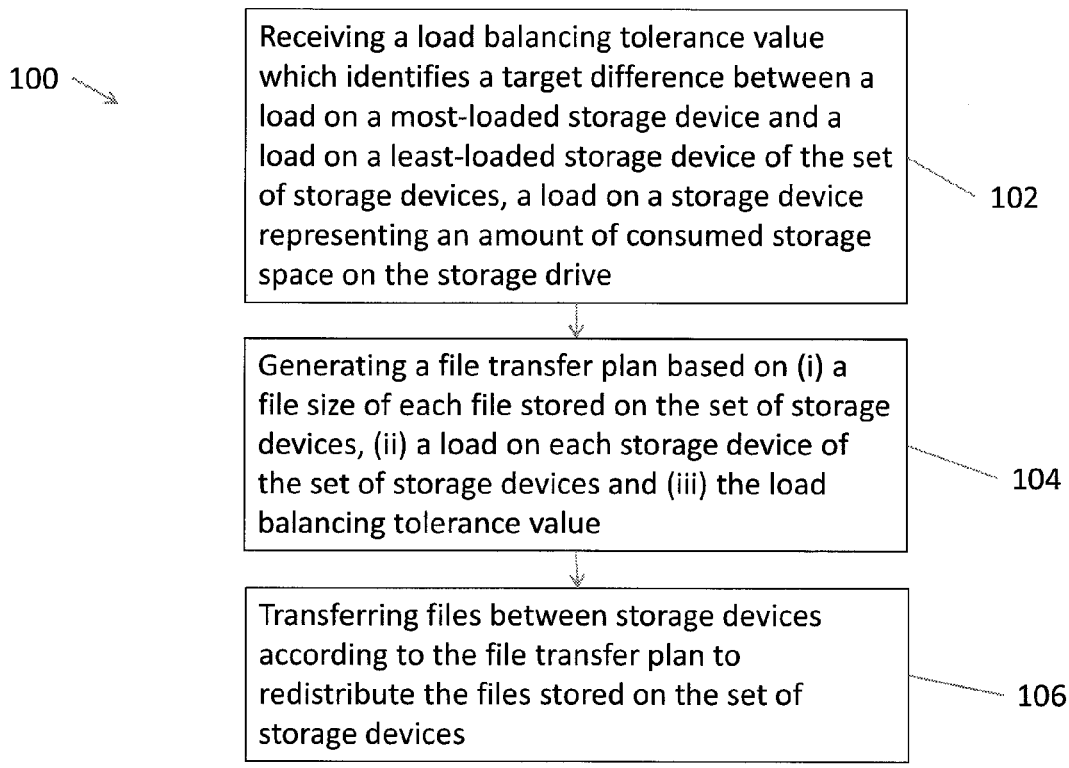
FIG. 6 is a flow chart illustrating a method of carrying out the improved technique within the electronic environment illustrated in FIG. 1.

FIG. 6 illustrates a method 100 of redistributing files stored on a set of storage devices. In step 102, the control circuitry 22 of the load monitoring server 14 receives a load balancing tolerance value which identifies a target difference between a load on a most-loaded storage device and a load on a least-loaded storage device of the set of storage devices, a load on a storage device representing an amount of consumed storage space on the storage drive. In step 104, the control circuitry 22 generates a file transfer plan based on (i) a file size of each file stored on the set of storage devices, (ii) a load on each storage device of the set of storage devices and (iii) the load balancing tolerance value. In step 106, the control circuitry 22 transfers files between storage devices according to the file transfer plan to redistribute the files stored on the set of storage devices.

Figure 7:
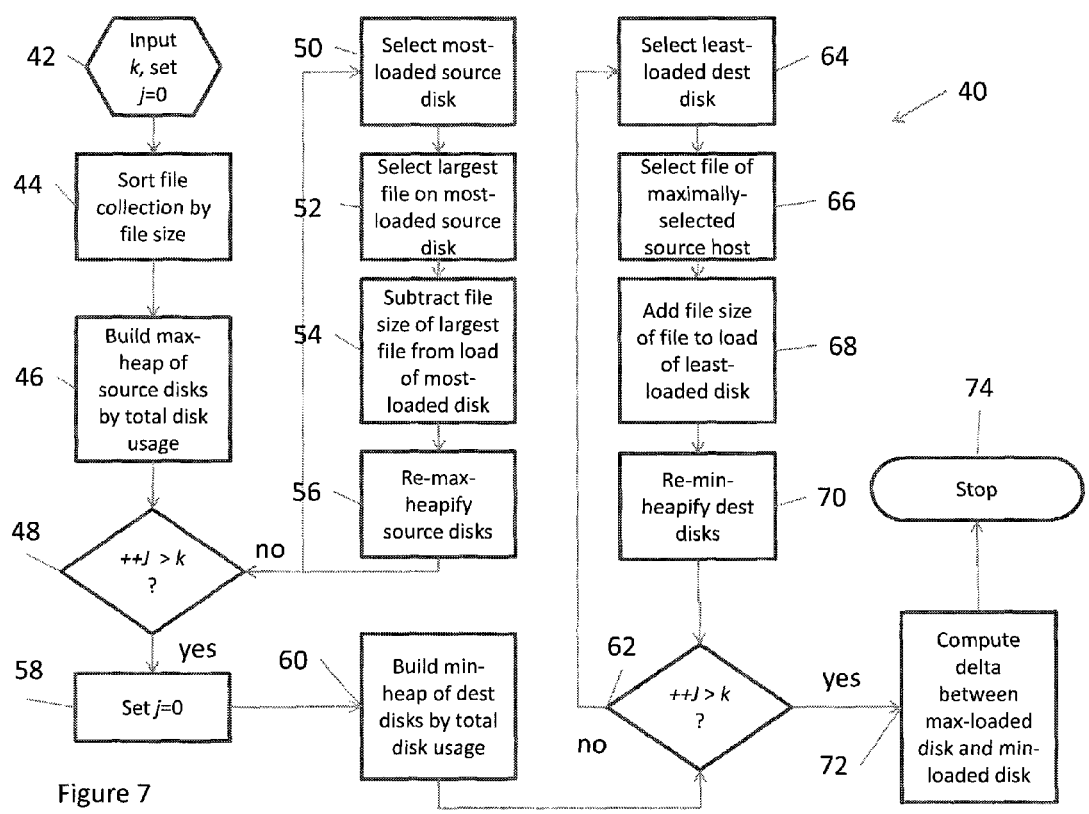
FIG. 7 is a flow chart illustrating further detail of the step of generating a file transfer plan as described in FIG. 6.

FIG. 7 is a flow chart which shows details 40 of step 104 for generating a file transfer plan 38 which results in the maximum difference between storage disks 16 being at most equal to the value of the server balancing tolerance parameter 18.

In step 42, the control circuitry 22 of the load monitoring server 14 receives a value of the server balancing tolerance parameter 18 and a file transfer index k from user 13, the value of k being a number of files to be included in file transfer plan 38. The control circuitry 22 also sets a counter j to zero in step 42.

In step 44, the control circuitry 22 generates a file collection 30 which lists all files stored on all storage devices 16 within electronic environment 10. The control circuitry 22 sorts file collection 30 by file size in descending order, largest file size first.

In step 46, the control circuitry 22 generates a source storage disk collection 34 which lists all source storage disks 16 within electronic environment 10 in descending order according to load. Control circuitry 22 stores source storage disk collection 34 within load monitoring server 14 as a max-heap; that is, control circuitry 22 builds source storage disk collection 34 as a max-heap.

In step 48, control circuitry 22 increments the counter value j and compares its value to the value of the file transfer index k. If the incremented value of the counter j is greater than k, then the next step in the generation of file transfer plan 38 is described in step 58. On the other hand, if the incremented value of the counter j is less than or equal to k, then the next step in the generation of file transfer plan 38 is described in step 50.

In step 50, control circuitry 22 extracts a most-loaded source storage disk from the max-heap of source storage disks. In some arrangements where the source storage disks are arranged within source servers, control circuitry 22 extracts a most-loaded source storage disk within a most-loaded source server.

In step 52, control circuitry 22 selects a largest file from file collection 30 on the most-loaded source storage disk. Control circuitry 22 places this largest file onto a list of selected files to be transferred.

In step 54, control circuitry 22 subtracts the file size of the selected largest file from the load of the most-loaded source storage disk. In some arrangements, control circuitry 22 also subtracts this file size from the load on the most-loaded source server.

In step 56, control circuitry 22 recognizes, with the extraction of step 50, that the source storage disks continue to be in a max-heap. Control circuitry 22 re-inserts the source storage disk from step 50 into the max-heap of the source storage disks identified in the source storage disk collection 34. The generation of file transfer plan 38 then returns to step 48.

In step 58, the counter value j is reset to zero as the list of selected files to be transferred has been constructed.

In step 60, control circuitry 22 generates a destination storage disk collection 34 which lists all destination storage disks 16 within electronic environment 10 in ascending order according to load. Control circuitry 22 stores destination storage disk collection 34 within load monitoring server 14 as a min-heap; that is, control circuitry 22 builds destination storage disk collection 34 as a min-heap.

In step 62, control circuitry 22 increments the counter value j and then compares the counter value j to the value of the file transfer index k. If the incremented value of the counter j is greater than k, then the next step in the generation of file transfer plan 38 is described in step 72. On the other hand, if the incremented value of the counter j is less than or equal to k, then the next step in the generation of file transfer plan 38 is described in step 64.

In step 64, control circuitry 22 selects a least-loaded destination storage disk from the collection of destination disks. In some arrangements where the destination disks are arranged within destination servers, control circuitry 22 selects a least-loaded destination storage disk within a least-loaded source server.

In step 66, control circuitry 22 selects, from the list of files to be transferred, a file stored on the most-loaded source storage disk having the largest file size. In some arrangements where the source storage disks are arranged within source servers, control circuitry 22 selects a file stored on the most-loaded source storage disk on the most-loaded source server having the largest file size.

In step 68, control circuitry 22 extracts the least-loaded destination storage disk from the min-heap of destination storage disks, and adds the selected file size from step 66 to its load. In some arrangements, control circuitry 22 also adds this file size to the load on the least-loaded destination server.

In step 70, control circuitry 22 recognizes, with the extraction of step 68, that the destination storage disks continue to be in a min-heap. Control circuitry 22 then re-inserts the destination storage disk from step 68 into the min-heap of destination storage disks 34. The generation of the file transfer plan then returns to step 62.

In step 72, as the file transfer plan 38 has been generated for the file transfer index of value k, control circuitry 22 evaluates a difference between the load of the most-loaded storage disk and the load of the least-loaded storage disk and compares the difference to the server balancing tolerance parameter 18. Control circuitry 22 stores file transfer plan 38 within a data structure on a storage drive in load monitoring server 14.

In step 74, the generation of file transfer plan 38 is finished.

Note that a value of a file transfer index k which represents a number of files to be transferred is specified and, based on the specified value, a file transfer plan is generated. In many cases, the difference between the load of the most-loaded storage disk and the load of the least-loaded storage disk which is evaluated in step 72 may be greater than the server balancing tolerance parameter 18. In such cases, a user 13 would repeat the generation of the file transfer plan with a new value of k. In some arrangements, however, a minimum number of files to be transferred which satisfies the constraint of having the maximum difference in load being less than or equal to the server balancing tolerance parameter 18.

Figure 8:
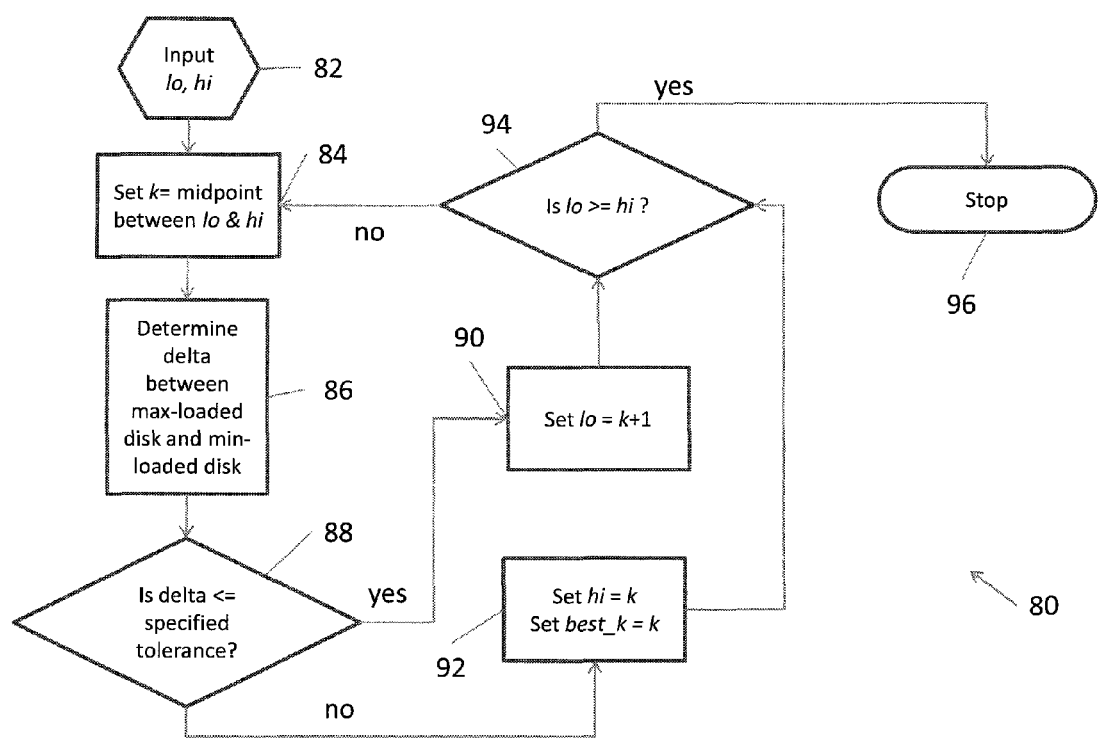
FIG. 8 is a flow chart illustrating further detail of the step of generating a file transfer plan as described in FIG. 6.

FIG. 8 shows details of another arrangement 80 in which control circuitry 22 determines the minimum value of the file transfer index k, that is, the minimum number of files needed to satisfy the constraint of having the maximum difference in load being less than or equal to the server balancing tolerance parameter 18.

In this case, the generation of file transfer plan 38 begins with step 82, in which values to and hi which represent endpoints of an optimization bracket are sent to control circuitry 22.

In step 84, control circuitry 22 chooses a value of the file transfer index k to be equal to the midpoint between the values to and hi.

In step 86, control circuitry 22 performs the generation of file transfer plan 38 with the current value of k and returns a value of δ which is the maximum difference in load between the source disks and the destination disks.

In step 88, control circuitry 22 determines whether the value of δ is less than or equal to the server balancing tolerance parameter 18. If δ is less than or equal to the server balancing tolerance parameter 18, then the next step is described in step 90; otherwise, the next step is described in step 92.

In step 90, control circuitry 22 sets the value of lo to k+1.

In step 92, control circuitry 22 sets the value of hi to k, and sets a value of best_k, representing the current minimum value of k, to k. Note that any potential new values of best_k will be smaller than the current value of best_k. In this sense, control circuitry 22 is generating a file transfer plan having a minimum number of files.

In step 94, control circuitry 22 determines if the width of the minimization bracket is greater than zero. If it not, then the generation of file transfer plan 38 is finished at step 96. If the bracket width is greater than zero, then the generation of file transfer plan 38 goes back to step 84.

Once the file transfer plan determines the minimum number of files to be transferred in file transfer plan 38, control circuitry 22 stores file transfer plan 38 in a file on a storage drive within load monitoring server 14 and subsequently executes transfers in file transfer plan 38.

In some arrangements, in the generation of file transfer plan 38 results in a round robin scheduling of the distribution of the files from source storage disks to destination storage disks.

While various embodiments of the invention have been particularly shown and described, it will be understood by those skilled in the art that various changes in form and details may be made therein without departing from the spirit and scope of the invention as defined by the appended claims.

For example, the control circuitry 22 can generate file transfer plan 38 using storage disks 16 which are not labeled "source" or "destination". In this case, a single collection of the storage disks is made, in ascending or descending order by load. "Source" and "destination" disks become a function of the loads on the storage disks. Further, a separate step is made to check whether a file selected for transfer is already on the disk to which it will be transferred. In that case, no entry is added to the file transfer table 38.

Also, it should be understood that, as described above, files are typically split into file segments, with each file segment stored on a different storage disk. In this case, if the placement of a file segment on the destination disk would violate the rule that no more than 2 segments of the same file may co-locate on the same storage disk, then no entry is added to the file transfer table 38.

In some arrangements, the storage disks 16 are arranged in storage servers 17 as described above, and a rule is that no two file segments can be co-located on the same storage server 17. In this case, if the placement of a file segment on the destination disk would violate this rule, then no entry is added to the file transfer table 38.

In some further arrangements source storage server identifiers are arranged in a max-heap according to aggregate load, and destination storage server identifiers are arranged in a min-heap according to aggregate load. As files are added to a transfer plan, the identifiers are extracted and reinserted according to the updated loads.

In some arrangements, file transfer plan 38 is stored on, and executed from, an additional outside server. In this case, load monitoring server 14 supplies the additional outside server with load and file data needed to generate file transfer plan 38. In other arrangements, the additional outside server can be replaced with a dedicated hardware device which includes an FPGA, an ASIC, etc.

The optimization scheme described in the generation of file transfer plan 38 by control circuitry 22 is an example of a binary, or midpoint, optimization scheme. In some arrangements, other optimization schemes, such as golden section, conjugate gradient, simulated annealing, genetic algorithm, etc., can be used in place of the binary optimization scheme illustrated here.

Furthermore, it should be understood that some embodiments are directed to load monitoring server 14 which redistributes files stored on a set of storage devices. Some embodiments are directed to load monitoring server 14. Some embodiments are directed to a system which redistributes files stored on a set of storage devices. Some embodiments are directed to a method of redistributing files stored on a set of storage devices. Also, some embodiments are directed to a computer program product which enables computer logic to perform the redistributing of files stored on a set of storage devices.

In some arrangements, monitoring server 14 is implemented by a set of processors or other types of control/processing circuitry running software. In such arrangements, the software instructions can be delivered to monitoring server 14 in the form of a computer program product (illustrated generally by code for computer program 110 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of redistributing files stored on a set of storage devices, the method comprising:
    receiving, by controlling circuitry within a controller, a load balancing tolerance value which identifies a target difference between a load on a most-loaded storage device and a load on a least-loaded storage device of the set of storage devices, a load on a storage device representing an amount of consumed storage space on the storage device;
    generating, by the controlling circuitry, a file transfer plan based on (i) a file size of each file stored on the set of storage devices, (ii) a load on each storage device of the set of storage devices and (iii) the load balancing tolerance value; and
    transferring, by the controlling circuitry, files between storage devices according to the file transfer plan to redistribute the files stored on the set of storage devices;
    wherein the load balancing tolerance value is greater than zero; and
    wherein the target difference is a number specified by a user representing a maximum difference tolerable to the user.

2. A method according to claim 1, wherein the file transfer plan includes a transfer table having a set of entries, each entry of the set of entries including:
    a file identifier which identifies a file stored on a storage device of the set of storage devices,
    a first storage device identifier which identifies a first storage device on which the file identified by the file identifier is stored, and
    a second storage device identifier which identifies a second storage device to which the file identified by the file identifier is to be moved; and
    wherein transferring the files between the storage devices according to the file transfer plan includes:
    in each entry of the set of entries, moving the file identified by the file identifier of the entry from the first storage device identified in the entry to the second storage device identified in the entry;
    wherein, after transferring the files according to the set of entries of the transfer table, a difference between the load on the most-loaded storage device and a load on the least-loaded storage device of the set of storage devices is less than or equal to the load balancing tolerance value.

3. A method according to claim 2, wherein generating a file transfer plan includes:
    generating a collection of storage device identifiers;
    generating a collection of file identifiers;
    sorting the storage device identifiers of the collection of storage device identifiers according to an amount of a load on each of the storage devices identified by the storage device identifiers; and
    sorting the file identifiers of the collection of files according to the file size of each file identified by a file identifier.

4. A method according to claim 3, further comprising:
    classifying a first group of storage device identifiers as source storage device identifiers and a second group of storage device identifiers as destination storage device identifiers, the source storage device identifiers identifying source storage devices to which no files are moved, the destination storage device identifiers identifying destination storage devices from which no files are moved;
    wherein generating a collection of storage device identifiers includes:
        generating a collection of source storage device identifiers and a collection of destination storage device identifiers;
    wherein sorting the storage device identifiers includes:
        arranging the collection of source storage device identifiers in a descending order from that identifying a most-loaded source storage device to that identifying a least-loaded source storage device; and
        arranging the collection of destination storage device identifiers in an ascending order from that identifying a least-loaded destination storage device to that identifying a most-loaded destination storage device.

5. A method according to claim 4, wherein generating the file transfer plan further includes:
    receiving a file transfer index;
    adding, to a file list, the file identifiers identifying the files having the largest file size stored on the most-loaded source storage device, the number of file identifiers in the file transfer list being the file transfer index;
    repeating, until the file list is empty:
        identifying, from the collection of source storage device identifiers, the most-loaded source storage device;
        generating an entry of the transfer table, the file identifier of the entry identifying, as the largest file, the file of the file list having the largest file size, the first storage device identifier identifying the source storage device on which the largest file is stored;
        removing, from the file list, the largest file;
        subtracting, from the value of the load on the most-loaded source storage device, the file size of the largest file; and
        arranging the collection of source storage device identifiers in a descending order from that identifying a most-loaded source storage device to that identifying a least-loaded source storage device; repeating, for each entry in the transfer table:
        identifying, from the collection of destination storage device identifiers, the least-loaded destination storage device;
        setting, as the second storage device identifier of the entry, the destination storage device identifier identifying the least-loaded destination storage device;
        adding, to the value of the load on the least-loaded destination storage device, the file size of the file identified by the file identifier of the entry; and
        arranging the collection of destination storage device identifiers in an ascending order from that identifying a least-loaded destination storage device to that identifying a most-loaded destination storage device;
    identifying the most-loaded storage device and the least-loaded storage device identified in a combined collection of source storage device identifiers and destination storage device identifiers; and evaluating a difference in the load on the most-loaded storage device and the least-loaded storage device.

6. A method according to claim 5, wherein generating the file transfer plan further includes:
generating a lower bound and an upper bound of a search interval;
generating an optimum index having an initial value equal to zero;
repeating until the lower bound of the search interval is greater than or equal to the upper bound of the search interval:
identifying, as the file transfer index, a number within the search interval;
if the difference between the load on the most-loaded storage device and the least-loaded storage device is less than or equal to the load balancing tolerance value:
setting a value of the optimum index equal to the file transfer index;
identifying, as the transfer table associated with the value of the optimum index, the file transfer plan generated from the file transfer index; and
setting the value of the upper bound of the search interval to the file transfer index; and
if the difference between the load on the most-loaded storage device and the least-loaded storage device is greater than the load balancing tolerance value:
setting the value of the lower bound of the search interval to one more than the file transfer index;
if the value of the optimum index is greater than zero:
outputting the transfer table associated with the value of the optimum index; and
if the value of the optimum index is less than or equal to than zero:
outputting an error message.

7. A method according to claim 5, wherein the set of storage devices are located within a set of storage servers, each storage server of the set of storage servers including storage devices of the set of storage devices;
wherein the method further comprises:
receiving a server balancing tolerance value which identifies a target difference between a load on a most-loaded storage server and a load on a least-loaded storage server of the set of storage servers, the load on a storage server being the sum of the loads of the storage devices of the storage server;
wherein generating the file transfer plan further includes:
generating a collection of storage server identifiers, each storage server identifier identifying a storage server of the set of storage servers;
sorting the storage server identifiers of the collection of storage server identifiers according to a value of the load on each of the storage servers identified by the storage server identifiers;
identifying, from the collection of storage server identifiers, a most-loaded storage server and a least-loaded storage server;
generating a lower bound and an upper bound of a search interval;
generating an optimum index having an initial value equal to zero;
repeating until the lower bound of the search interval is greater than or equal to the upper bound of the search interval:
identifying, as the file transfer index, a number within the search interval;

if the difference between the load on the most-loaded storage device and the least-loaded storage device is less than or equal to the load balancing tolerance value:
setting a value of the optimum index equal to the file transfer index;
identifying, as the transfer table associated with the value of the optimum index, the file transfer plan generated from the file transfer index; and
setting the value of the upper bound of the search interval to the file transfer index; and
if the difference between the load on the most-loaded storage device and the least-loaded storage device is greater than the load balancing tolerance value:
setting the value of the lower bound of the search interval to one more than the file transfer index;
if the value of the optimum index is greater than zero:
outputting the transfer table associated with the value of the optimum index; and
if the value of the optimum index is less than or equal to than zero:
outputting an error message.

8. A method according to claim 3, wherein generating the file transfer plan further includes:
receiving a threshold file value size; and
removing, from the collection of file identifiers, file identifiers which identify files having a file size smaller than the threshold file size value.

9. A method according to claim 8, wherein each file stored on a set of storage devices includes a set of file segments, information stored in the set of file segments of each file being equivalent to information stored in the file, each file segment of the set of file segments being stored on a different storage device, each file segment being identified by a file identifier which identifies the file segment and the file which includes the file segment;
wherein removing the file identifiers includes:
receiving, from a file identifier of the collection of file identifiers, and indication whether the file identifier identifies a file segment or a file;
if the file identifier identifiers a file segment:
performing a query operation constructed and arranged to ascertain the file size of the file which includes the file segment;
if the size of the file as ascertained by the query operation is less than the threshold file size value, removing the file identifier from the collection of file identifiers; and
if the size of the file as ascertained by the query operation is greater than or equal to the threshold file size value, keeping the file identifier in the collection of file identifiers; and
if the file identifier does not identify a file segment:
removing the file identifier from the collection of file identifiers.

10. A method according to claim 1, wherein transferring the files between the storage devices according to the file transfer plan further includes:
transferring the files identified in the file transfer plan according to a round-robin distribution.

11. A method as in claim 1, wherein transferring the files between the storage devices according to the file transfer plan includes:
terminating the transfer of the files when a difference between the load on the most-loaded storage device and the load on the least-loaded storage device of the set of storage devices is less than or equal to the target difference.

12. A method as in claim 1, wherein the load balancing tolerance value indicates a number of Gigabytes (GB) between the load on the most-loaded storage device and the load on the least-loaded storage device of the set of storage devices; and
    wherein generating the file transfer plan includes counting the number of files to be transferred based on that number of GB.

13. A method as in claim 1, further comprising:
    after generating the file transfer plan, comparing a current load difference to the load balancing tolerance value, the current load difference being a difference between the load on the most-loaded storage device and the load on the least-loaded storage device of the set of storage devices, the current load difference being evaluated according to the file transfer plan.

14. A method as in claim 13, further comprising in response to the current load difference being greater than the load balancing tolerance value, generating another file transfer plan prior to transferring the files between the storage devices.

15. A system constructed and arranged to redistribute files stored on a set of storage devices, the system comprising:
    a network interface;
    a memory; and
    a controller which includes controlling circuitry which is coupled to the memory, the controlling circuitry constructed and arranged to:
        receive a load balancing tolerance value which identifies a target difference between a load on a most-loaded storage device and a load on a least-loaded storage device of the set of storage devices, a load on a storage device representing an amount of consumed storage space on the storage device;
        generate a file transfer plan based on (i) a file size of each file stored on the set of storage devices, (ii) a load on each storage device of the set of storage devices and (iii) the load balancing tolerance value; and
    transfer files between storage devices according to the file transfer plan to redistribute the files stored on the set of storage devices;
    wherein the load balancing tolerance value is greater than zero; and
    wherein the target difference is a number specified by a user representing a maximum difference tolerable to the user.

16. A system according to claim 15, wherein the file transfer plan includes a transfer table having a set of entries, each entry of the set of entries including:
    a file identifier which identifies a file stored on a storage device of the set of storage devices,
    a first storage device identifier which identifies a first storage device on which the file identified by the file identifier is stored, and
    a second storage device identifier which identifies a second storage device to which the file identified by the file identifier is to be moved; and
    wherein transferring the files between the storage devices according to the file transfer plan includes:
        in each entry of the set of entries, moving the file identified by the file identifier of the entry from the first storage device identified in the entry to the second storage device identified in the entry;
    wherein, after transferring the files according to the set of entries of the transfer table, a difference between the load on the most-loaded storage device and a load on the least-loaded storage device of the set of storage devices is less than or equal to the load balancing tolerance value.

17. A system according to claim 16, wherein generating a file transfer plan includes:
    generating a collection of storage device identifiers;
    generating a collection of file identifiers;
    sorting the storage device identifiers of the collection of storage device identifiers according to an amount of a load on each of the storage devices identified by the storage device identifiers; and
    sorting the file identifiers of the collection of files according to the file size of each file identified by a file identifier.

18. A system according to claim 17, wherein the controlling circuitry is further constructed and arranged to:
    classify a first group of storage device identifiers as source storage device identifiers and a second group of storage device identifiers as destination storage device identifiers, the source storage device identifiers identifying source storage devices to which no files are moved, the destination storage device identifiers identifying destination storage devices from which no files are moved;
    wherein generating a collection of storage device identifiers includes:
        generating a collection of source storage device identifiers and a collection of destination storage device identifiers;
    wherein sorting the storage device identifiers includes:
        arranging the collection of source storage device identifiers in a descending order from that identifying a most-loaded source storage device to that identifying a least-loaded source storage device; and
        arranging the collection of destination storage device identifiers in an ascending order from that identifying a least-loaded destination storage device to that identifying a most-loaded destination storage device.

19. A system according to claim 18, wherein generating the file transfer plan further includes:
    receiving a file transfer index;
    adding, to a file list, the file identifiers identifying the files having the largest file size stored on the most-loaded source storage device, the number of file identifiers in the file transfer list being the file transfer index;
    repeating, until the file list is empty:
        identifying, from the collection of source storage device identifiers, the most-loaded source storage device;
        generating an entry of the transfer table, the file identifier of the entry identifying, as the largest file, the file of the file list having the largest file size, the first storage device identifier identifying the source storage device on which the largest file is stored;
        removing, from the file list, the largest file;
        subtracting, from the value of the load on the most-loaded source storage device, the file size of the largest file; and
        arranging the collection of source storage device identifiers in a descending order from that identifying a most-loaded source storage device to that identifying a least-loaded source storage device;
    repeating, for each entry in the transfer table:
        identifying, from the collection of destination storage device identifiers, the least-loaded destination storage device;

setting, as the second storage device identifier of the entry, the destination storage device identifier identifying the least-loaded destination storage device;

adding, to the value of the load on the least-loaded destination storage device, the file size of the file identified by the file identifier of the entry; and arranging the collection of destination storage device identifiers in an ascending order from that identifying a least-loaded destination storage device to that identifying a most-loaded destination storage device;

identifying the most-loaded storage device and the least-loaded storage device identified in a combined collection of source storage device identifiers and destination storage device identifiers; and evaluating a difference in the load on the most-loaded storage device and the least-loaded storage device.

20. A system according to claim 19, wherein generating the file transfer plan further includes:

generating a lower bound and an upper bound of a search interval;

generating an optimum index having an initial value equal to zero;

repeating until the lower bound of the search interval is greater than or equal to the upper bound of the search interval:

identifying, as the file transfer index, a number within the search interval;

if the difference between the load on the most-loaded storage device and the least-loaded storage device is less than or equal to the load balancing tolerance value:

setting a value of the optimum index equal to the file transfer index;

identifying, as the transfer table associated with the value of the optimum index, the file transfer plan generated from the file transfer index; and setting the value of the upper bound of the search interval to the file transfer index; and if the difference between the load on the most-loaded storage device and the least-loaded storage device is greater than the load balancing tolerance value:

setting the value of the lower bound of the search interval to one more than the file transfer index;

if the value of the optimum index is greater than zero:

outputting the transfer table associated with the value of the optimum index; and if the value of the optimum index is less than or equal to than zero:

outputting an error message.

21. A system according to claim 19, wherein the set of storage devices are located within a set of storage servers, each storage server of the set of storage servers including storage devices of the set of storage devices;

wherein the controlling circuitry is further constructed and arranged to:

receive a server balancing tolerance value which identifies a target difference between a load on a most-loaded storage server and a load on a least-loaded storage server of the set of storage servers, the load on a storage server being the sum of the loads of the storage devices of the storage server;

wherein generating the file transfer plan further includes:

generating a collection of storage server identifiers, each storage server identifier identifying a storage server of the set of storage servers;

sorting the storage server identifiers of the collection of storage server identifiers according to a value of the load on each of the storage servers identified by the storage server identifiers;

identifying, from the collection of storage server identifiers, a most-loaded storage server and a least-loaded storage server;

generating a lower bound and an upper bound of a search interval;

generating an optimum index having an initial value equal to zero;

repeating until the lower bound of the search interval is greater than or equal to the upper bound of the search interval:

identifying, as the file transfer index, a number within the search interval;

if the difference between the load on the most-loaded storage device and the least-loaded storage device is less than or equal to the load balancing tolerance value:

setting a value of the optimum index equal to the file transfer index;

identifying, as the transfer table associated with the value of the optimum index, the file transfer plan generated from the file transfer index; and setting the value of the upper bound of the search interval to the file transfer index; and if the difference between the load on the most-loaded storage device and the least-loaded storage device is greater than the load balancing tolerance value:

setting the value of the lower bound of the search interval to one more than the file transfer index;

if the value of the optimum index is greater than zero:

outputting the transfer table associated with the value of the optimum index; and if the value of the optimum index is less than or equal to than zero:

outputting an error message.

22. A system according to claim 17, wherein generating the file transfer plan further includes:

receiving a threshold file value size; and removing, from the collection of file identifiers, file identifiers which identify files having a file size smaller than the threshold file size value.

23. A system according to claim 22, wherein each file stored on a set of storage devices includes a set of file segments, information stored in the set of file segments of each file being equivalent to information stored in the file, each file segment of the set of file segments being stored on a different storage device, each file segment being identified by a file identifier which identifies the file segment and the file which includes the file segment;

wherein removing the file identifiers includes:

receiving, from a file identifier of the collection of file identifiers, and indication whether the file identifier identifies a file segment or a file;

if the file identifier identifiers a file segment:

performing a query operation constructed and arranged to ascertain the file size of the file which includes the file segment;

if the size of the file as ascertained by the query operation is less than the threshold file size value, removing the file identifier from the collection of file identifiers; and if the size of the file as ascertained by the query operation is greater than or equal to the threshold file size value, keeping the file identifier in the collection of file identifiers; and if the file identifier does not identify a file segment:
removing the file identifier from the collection of file identifiers.

24. A computer program product having a non-transitory computer readable storage medium which stores a set of instructions to redistribute files stored on a set of storage devices, the set of instructions, when carried out by a computerized device, causing the computerized device to:

receive a load balancing tolerance value which identifies a target difference between a load on a most-loaded storage device and a load on a least-loaded storage device of the set of storage devices, a load on a storage device representing an amount of consumed storage space on the storage device;

generate a file transfer plan based on (i) a file size of each file stored on the set of storage devices, (ii) a load on each storage device of the set of storage devices and (iii) the load balancing tolerance value; and transfer files between storage devices according to the file transfer plan to redistribute the files stored on the set of storage devices;

wherein the load balancing tolerance value is greater than zero; and wherein the target difference is a number specified by a user representing a maximum difference tolerable to the user.

* * * * *